(12) United States Patent
Zinar et al.

(10) Patent No.: US 9,547,664 B2
(45) Date of Patent: *Jan. 17, 2017

(54) SELECTING CANDIDATE ROWS FOR DEDUPLICATION

(71) Applicant: Microsoft Corporation, Redmond, WA (US)

(72) Inventors: Yaron Zinar, Petah Tikva (IL); Efim Hudis, Belevuw, WA (US); Yifat Orlin, Tel-Aviv (IL); Gal Novik, Tel-Aviv (IL); Yuri Gurevich, Edmonds, WA (US); Gad Peleg, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/266,829

(22) Filed: May 1, 2014

(65) Prior Publication Data

US 2014/0236907 A1 Aug. 21, 2014

Related U.S. Application Data

(63) Continuation of application No. 13/593,508, filed on Aug. 23, 2012, now Pat. No. 8,719,236.

(51) Int. Cl.
*G06F 17/30* (2006.01)
*G06F 3/06* (2006.01)

(52) U.S. Cl.
CPC ... *G06F 17/30156* (2013.01); *G06F 17/30303* (2013.01); *G06F 3/0641* (2013.01); *G06F 17/30138* (2013.01)

(58) Field of Classification Search
CPC ............................ G06F 3/0641; G06F 11/1453

USPC ........................................................ 707/692
See application file for complete search history.

(56) References Cited

U.S. PATENT DOCUMENTS

| | | | |
|---|---|---|---|
| 5,384,902 A * | 1/1995 | Carlsen ................. | G06T 11/001 345/593 |
| 6,725,214 B2 | 4/2004 | Garcia-Chiesa | |
| 7,577,653 B2 * | 8/2009 | Dasari ............... | G06F 17/30303 |
| 7,818,278 B2 * | 10/2010 | Padovitz ........... | G06F 17/30489 706/45 |
| 7,899,796 B1 * | 3/2011 | Borthwick ........ | G06F 17/30489 707/692 |

(Continued)

OTHER PUBLICATIONS

Coetzee, Derrick, "TinyLex: Static N-Gram Index Pruning with Perfect Recall", Retrieved at <<http://www.cs.berkeley.edu/~dcoetzee/publications/TinyLex,%20Static%20N-Gram%20Index%20Pruning%20with%20Perfect%20Recall.pdf>>, Conference on Information and Knowledge Management, Oct. 28, 2008, pp. 1-10.

(Continued)

*Primary Examiner* — Pierre Vital
*Assistant Examiner* — Nargis Sultana
(74) *Attorney, Agent, or Firm* — Aneesh Mehta; Kate Drakos; Micky Minhas

(57) ABSTRACT

The present invention extends to methods, systems, and computer program products for selecting candidate records for deduplication from a table. A table can be processed to compute an inverse index for each field of the table. A deduplication algorithm can traverse the inverse indices in accordance with a flexible user-defined policy to identify candidate records for deduplication. Both exact matches and approximate matches can be found.

18 Claims, 9 Drawing Sheets

(56) References Cited

U.S. PATENT DOCUMENTS

| | | | | |
|---|---|---|---|---|
| 8,620,930 | B2* | 12/2013 | Gulhane | G06K 9/3266 707/748 |
| 2007/0203925 | A1* | 8/2007 | Sandler | G06F 17/30333 |
| 2008/0010316 | A1* | 1/2008 | Liao | G06F 17/273 |
| 2008/0097992 | A1* | 4/2008 | Monro | G06F 17/30675 |
| 2008/0126335 | A1* | 5/2008 | Gandhi | G06F 17/30622 |
| 2009/0063404 | A1* | 3/2009 | Hacigumus | G06F 17/30625 |
| 2009/0171955 | A1* | 7/2009 | Merz | G06F 17/30985 |
| 2009/0228599 | A1 | 9/2009 | Anglin et al. | |
| 2009/0307251 | A1* | 12/2009 | Heller | G06F 17/3015 |
| 2010/0005048 | A1* | 1/2010 | Bodapati | G06F 17/30303 706/47 |
| 2010/0318519 | A1* | 12/2010 | Hadjieleftheriou | G06F 17/30336 707/742 |
| 2011/0106782 | A1* | 5/2011 | Ke | G06F 17/30256 707/706 |
| 2012/0117076 | A1* | 5/2012 | Austermann | G06F 17/30542 707/741 |
| 2012/0158782 | A1* | 6/2012 | Transier | G06F 17/30622 707/771 |
| 2012/0221534 | A1* | 8/2012 | Gao | G06F 17/30312 707/692 |
| 2013/0007026 | A1 | 1/2013 | Alspector et al. | |
| 2013/0173562 | A1* | 7/2013 | Alspector | H04L 12/585 707/692 |

OTHER PUBLICATIONS

"Fuzzy Matching Deduplication in less than Exponential Time?", Retrieved at <<http://stackoverflow.com/questions/7196053/fuzzy-matching-deduplication-in-less-than-exponential-time>>, Jun. 6, 2012, pp. 4.

Hylton, Jeremy A, "Identifying Related Records", Retrieved at <<http://www.python.org/~jeremy/pubs/thesis/node6.html>>, Feb. 19, 1996, pp. 9.

Cochinwala, et al., "Record Matching: Past, Present and Future", Retrieved at <<http://docs.lib.purdue.edu/cgi/viewcontent.cgi?article=2509&context=cstech>>, Computer Science Technical Reports, Jan. 7, 2001, pp. 36.

Miller et al., "Performance and Scalability of a Large-Scale N-gram Based Information Retrieval System", Retrieved at <<www.soe.ucsc.edu/~elm/Papers/jodi00.pdf>>, Jan. 2000, pp. 24.

Lopresti, et al., "Block Edit Models for Approximate String Matching", Retrieved at <<www.cse.lehigh.edu/~lopresti/Publications/1997/tcs97.pdf>>, Appears in Theoretical Computer Science, 1997, pp. 1-22.

Navarro, Gonzalo, "A Guided Tour to Approximate String Matching", Retrieved at <<http://citeseerx.ist.psu.edu/viewdoc/summary?doi=10.1.1.21.3112>>, Mar. 2001, pp. 1-68.

Yasushi, et al., "Optimizing query evaluation in n-gram indexing", Retrieved at <<http://www.acm.org/pubs/articles/proceedings/ir/290941/p367-ogawa/p367-ogawa.pdf>>, Proceedings of the 21st annual international ACM SIGIR conference on Research and development in information retrieval, 1998, pp. 367-368.

Li, et al., "Efficient Merging and Filtering Algorithms for Approximate String Searches", Retrieved at <<www.ics.uci.edu/~chenli/pub/icde08-stringsearch.pdf>>, Proceedings of the 2008 IEEE 24th International Conference on Data Engineering, 2008, pp. 10.

Ananthakrishna, et al., "Eliminating Fuzzy Duplicates in Data Warehouses", Retrieved at <<www.vldb.org/conf/2002/S17P01.pdf>>, Proceedings of the 28th VLDB Conference, 2002, pp. 12.

Sarawagi, et al., "Efficient set joins on similarity predicates", Retrieved at <<http://www.cs.uiuc.edu/class/fa05/cs591han/sigmodpods04/sigmod/pdf/R-416.pdf>>, Proceedings of the ACM SIGMOD international conference on Management of data, Jun. 13-18, 2004, pp. 743-754.

Okazaki, et al., "Simple and Efficient Algorithm for Approximate Dictionary matching", Retrieved at <<http://www.aclweb.org/anthology-new/C/C10/C10-1096.pdf>>, Proceedings of the 23rd International Conference on Computational Linguistics, Aug. 2010, pp. 851-859.

Cohen, William M., "Integration of heterogeneous databases without common domains using queries based on textual similarity", Retrieved at <<http://www.cs.washington.edu/education/courses/cse590q/04wi/papers/cohen.pdf>>, Proceedings of the 1998 ACM SIGMOD international conference on Management of data, 1998, pp. 12.

Monge, et al., "An efficient domain-independent algorithm for detecting approximately duplicate database records", Retrieved at <<http://citeseerx.ist.psu.edu/viewdoc/summary?doi=10.1.1.28.8405>>, 1997, pp. 7.

Bilenko, et al., "Adaptive Name Matching in Information Integration", Retrieved at <<www.cs.cmu.edu/~pradeepr/papers/ieee03.pdf>>, IEEE Intelligent Systems, vol. 18, No. 5, 2008, pp. 2-9.

Araujo, et al., "Large text searching allowing errors", Retrieved at <<http://homepages.dcc.ufmg.br/~nivio/papers/wsp97.ps>>, 1997, pp. 20.

Lee, et al., "n-Gram/2L a Space and Time Efficient Two-Level n-Gram Inverted Index Structure", Retrieved at <<http://www.dbis.ethz.ch/education/ss2008/ss08_dbs_algodbs/HessTalk.pdf>>, 2005, pp. 50.

Schnitzer, et al., "A Filter-and-Refine Indexing Method for Fast Similarity Search in Millions of Music Tracks", Retrieved at <<http://ismir2009.ismir.net/proceedings/OS6-3.pdf>>, Proceedings of the 10th International Society for Music Information Retrieval Conference (ISMIR), 2009, pp. 537-542.

Wang, et al., "TrieJoin: Efficient Triebased String Similarity Joins with EditDistance Constraints", Retrieved at <<http://dbgroup.cs.tsinghua.edu.cn/wangjn/papers/vldb2010-triejoin.pdf>>, Proceedings of the VLDB Endowment, vol. 3, No. 1, 2010, pp. 12.

Monz, et al., "Inverted Index Construction", Retrieved at <<http://www.n3labs.com/pdf/make-inverted.pdf>>, 2002, pp. 1-39.

Yasushi, Ogawa, "Pseudo-frequency method: an efficient document ranking retrieval method for n-gram indexing", Retrieved at <<ftp://ftp.cse.buffalo.edu/users/azhang/disc/disc01/cd1/out/papers/sigir/p321-ogawa.pdf>>, Proceedings of the 23rd annual international ACM SIGIR conference on Research and development in information retrieval, 2000, pp. 321-323.

Ullman, Jeffrey D., "Mining of Massive Datasets", Retrieved at <<http://infolab.stanford.edu/~ullman/mmds.html>>, Jul. 4, 2012, pp. 1-329.

Mihov, et al., "Fast Approximate Search in Large Dictionaries", Retrieved at <<http://acl.ldc.upenn.edu/J/J04/J04-4003.pdf>>, vol. 30, No. 4, Mar. 25, 2004, pp. 451-477.

Justin Zobel and Philip Dart, "Finding Approximate Matches in Large Lexicons" 1995, Software-Practice and Experience, vol. 25(3), 331-345.

Min-Soo Kim, n-Gram/2L: A Space and Time Efficient Two-Level n-Gram Inverted Index Structure, 2005, Proceeding of the 31st VLDB Conference, pp. 325-336.

Non-Final Office Action, U.S. Appl. No. 13/593,508 mailing date Jun. 17, 2013, pp. 16.

Notice of Allowance, U.S. Appl. No. 14/461,948 mailing date Dec. 16, 2013, pp. 11.

* cited by examiner

Main Part – Iterating over the records: 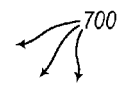

1. Build_index()
2. Initialize $record\_pairs \leftarrow \{\}$
3. For each $r_i$ in $\{r_1, r_2, ..., r_n\}$
   a. For each $r_j$ in Find_Record_Duplicate_Candidates($r_i$):
      i. If $record\_score(r_i, r_j) > M$:
         1. $record\_pairs \leftarrow record\_pairs \cup \{(i, j)\}$
4. Return $record\_pairs$

*Fig. 7*

Subroutine – Build_Index(): 

1. For each $l$ in $D_{Exact}$ :
   a. For each $r_i$ in $\{r_1, r_2, ..., r_n\}$
      i. Initialize $value\_index[l, r_{i,l}] \leftarrow \{\}$
2. For each $l$ in $D_{Similar}$ :
   a. For each $r_i$ in $\{r_1, r_2, ..., r_n\}$
      i. For each trigram $t_k$ in $r_{i,l}$:
         1. Initialize $trigram\_index[l, t_k] \leftarrow \{\}$
3. For each $r_i$ in $\{r_1, r_2, ..., r_n\}$
   a. For each field $l$ in $\{1, .., k\}$
      i. If $l \in D_{Exact}$ $value\_index[l, r_{i,l}] \leftarrow value\_index[l, r_{i,l}] \cup \{r_i\}$
      ii. If $l \in D_{Similar}$ for each trigram $t_k$ in $r_{i,l}$:
         1. $trigram\_index[l, t_k] \leftarrow trigram\_index[l, t_k] \cup \{r_i\}$

*Fig. 8*

*Subroutine – Find_Record_Duplicate_Candidates($r_i$):*  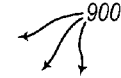

// decompose record and retrieve initial set of records sets
1. Initialize $record\_decomposition \leftarrow \{\}$
2. For each field $l$ in $\{1,..,k\}$
    a. If $\in D_{Exact}$ : $record\_decomposition \leftarrow record\_decomposition \cup$
       $(l, value\_index[l, r_{i,l}])$.
    b. If $l \in D_{Similar}$ : For each trigram $t_k$ in $r_{i,l}$:
       i. $record\_decomposition \leftarrow record\_decomposition \cup$
          $(l, trigram\_index[l, t_k])$
3. Sort $record\_decomposition$ by records sets sizes.

// select (in a greedy manner) a small set of records sets which is sufficient
// to ensure that records not visited cannot be duplicates of current record
4. Initialize $reduced\_score = 0$
5. Initialize $filtered\_records\_sets \leftarrow \{\}$
6. For $l = 1..k$ :
    a. Initialize $\beta[l] \leftarrow 0$
7. While $reduced\_score < 1 - M$
    a. Fetch next set $(l, S)$ from $record\_decomposition$ and set:
       $filtered\_records\_sets \leftarrow filtered\_records\_sets \cup \{S\}$.
    b. If $l \in D_{Exact}$ : $reduced\_score = reduced\_score + w_l$
    c. If $l \in D_{Similar}$ :
       i. $L \leftarrow Length(r_{i,l})$
       ii. $\beta[l] = \beta[l] + 1$
       iii. $reduced\_score = reduced\_score + w_l(\frac{1}{\frac{2L}{\beta[l]}-1} - \frac{1}{\frac{2L}{\beta[l]-1}-1})$ // iterate over records sets and perform a traversal
// on records that returns each unique record once
8. Initialize $iterated\_records \leftarrow \{\}$
9. For each set $S$ in $filtered\_records\_sets$:
    a. For each record $r_j$ in $S$:
       i. If $r_j$ not in $iterated\_records$:
          1. $iterated\_records \leftarrow iterated\_records \cup \{r_j\}$

*Fig. 9*

SELECTING CANDIDATE ROWS FOR DEDUPLICATION

CROSS-REFERENCE TO RELATED APPLICATIONS

This application is a continuation of and claims the benefit of and priority to U.S. patent application Ser. No. 13/593,508, entitled "Selecting Candidate Rows For Deduplication", filed Aug. 23, 2012 by Yaron Zinar et. al., the entire contents of which are expressly incorporated by reference.

BACKGROUND

Background and Relevant Art

Businesses often use database systems to store data. Over time, tables of a database can become populated with records that, while not identical, are in fact duplicates (i.e., represent the same entity, such as, for example, a customer or client). Duplicate records can result from errors in data entry, data format conversions, use of different data types, etc.

Storing duplicate data is an inefficient use of computer system resources, including but not limited to storage space. Duplicate data can also cause inefficient use of financial resources. For example, when stored data is used to generate advertising mailings, two (or potentially more) sets of mailings and other communications can be sent to the same customer. These resource inefficiencies increase as the size of stored data increases.

Deduplication is a process that removes duplicate data from a data source by matching against itself and creating unique records. Deduplication can be used on database tables to at least mitigate (and approach eliminating) inefficient resource usage caused by duplicate data.

One deduplication solution includes iterating over all pairs in a table and directly computing a similarity score. This solution is relatively simple and catches virtually all duplicates but results in inferior performance time-wise (the time complexity is essentially quadratic). Another deduplication solution uses preprocessing to reduce the number of comparisons. This other solution has superior performance time-wise but compromises completeness of the results (i.e., not all duplicates are identified). One example of this other solution is a min-hash algorithm for N-gram Jaccard similarity. A further deduplication solution creates an n-gram inverse index for a list of strings (which can also be viewed as a table with a single column). The n-gram inverse index can be traversed to deduplicate the list of strings.

BRIEF SUMMARY

Embodiments of the present invention extend to methods, systems, and computer program products for selecting candidate rows for deduplication from a table. A table is accessed. The table includes a plurality of records. Each record stores at least a field value for a field and an additional field value for an additional field.

An inverse index is created for the field. For each record, the field value is decomposed into a plurality of n-grams (e.g., bigrams, trigrams, etc.). For each of the plurality of n-grams, the n-gram is mapped to a record set identifying one or more records that contain the n-gram in their field value. An additional inverse index is created for the additional field. For each record, the additional field value is decomposed into one or more features (which may or may not be n-grams). For each of the one or more features, the feature is mapped to a record set identifying one or more records that contain the feature in their additional field value.

A minimum matching score is accessed. The minimum matching score indicates a level of similarity between a record and another record for the other record to be considered a duplicate candidate of the record. For a record included in the table, the inverse index and the additional inverse index are traversed together from smallest record set to largest record set among the inverse index and the additional inverse index. Traversal continues until a theoretical maximum matching score for any non-identified records does not satisfy the minimum matching score.

Traversal includes identifying a record set that includes the next smallest number of other records. Traversal also includes calculating the theoretical maximum matching score between the record and any further records not included in the identified record set based on a field weight for the field. Traversal further includes calculating an actual matching score between the record and each record included in the identified record set in accordance with the field weight and a further field weight for the further field. Any records included in an identified record set having an actual matching score that satisfies the minimum matching score are selected as duplicate candidates for the record.

In some embodiments, the field is an approximate match field and the additional field is an exact match field. In these embodiments, the inverse index for the field includes n-grams decomposed from field values. The additional inverse index includes the actual additional field values. In further embodiments, both the field and the additional field are approximate match fields. In these further embodiments, the inverse index and the additional inverse index include n-grams decomposed from field values and from additional field values respectively.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 7 illustrates an example of an algorithm for iterating over records to identify deduplication candidates.

FIG. 8 illustrates an example of a subroutine for building an index

FIG. 9 illustrates an example of a subroutine for finding candidate records for deduplication.

DETAILED DESCRIPTION

Figure 1A:
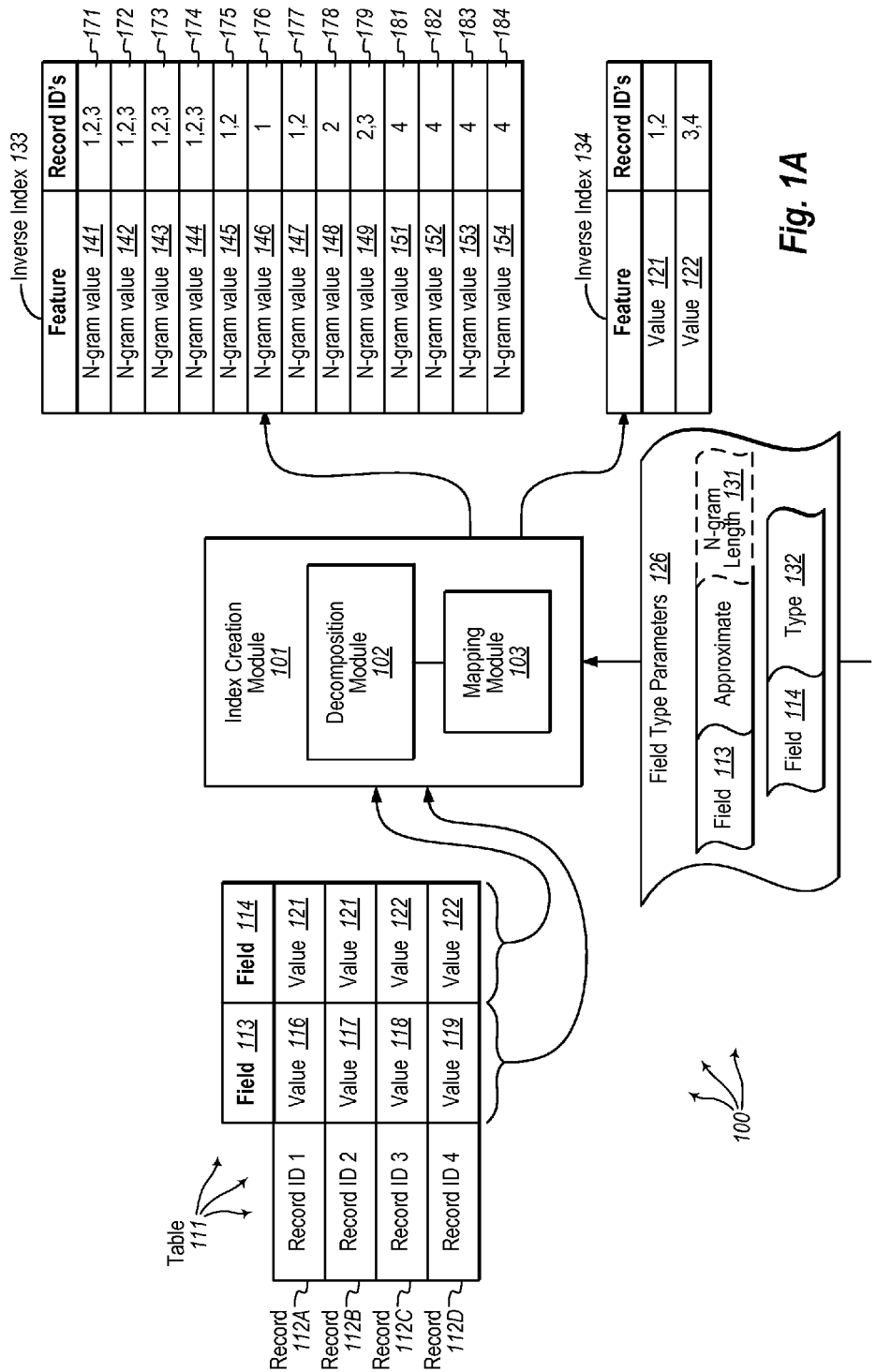
FIGS. 1A and 1B illustrate an example computer architecture that facilitates selecting candidate records for deduplication from a table.

Embodiments of the present invention extend to methods, systems, and computer program products for selecting candidate rows for deduplication from a table. A table is accessed. The table includes a plurality of records. Each record stores at least a field value for a field and an additional field value for an additional field.

An inverse index is created for the field. For each record, the field value is decomposed into a plurality of n-grams (e.g., bigrams, trigrams, etc.). For each of the plurality of n-grams, the n-gram is mapped to a record set identifying one or more records that contain the n-gram in their field value. An additional inverse index is created for the additional field. For each record, the additional field value is decomposed into one or more features (which may or may not be n-grams). For each of the one or more features, the feature is mapped to a record set identifying one or more records that contain the feature in their additional field value.

A minimum matching score is accessed. The minimum matching score indicates a level of similarity between a record and another record for the other record to be considered a duplicate candidate of the record. For a record included in the table, the inverse index and the additional inverse index are traversed together from smallest record set to largest record set among the inverse index and the additional inverse index. Traversal continues until a theoretical maximum matching score for any non-identified records does not satisfy the minimum matching score.

Traversal includes identifying a record set that includes the next smallest number of other records. Traversal also includes calculating the theoretical maximum matching score between the record and any further records not included in the identified record set based on a field weight for the field. Traversal further includes calculating an actual matching score between the record and each record included in the identified record set in accordance with the field weight and a further field weight for the further field. Any records included in an identified record set having an actual matching score that satisfies the minimum matching score are selected as duplicate candidates for the record.

In some embodiments, the field is an approximate match field and the additional field is an exact match field. In these embodiments, the inverse index for the field includes n-grams decomposed from field values. The additional inverse index includes the actual additional field values. In further embodiments, both the field and the additional field are approximate match fields. In these further embodiments, the inverse index and the additional inverse index include n-grams decomposed from field values and from additional field values respectively.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In this description and in the following claims, an "exact match" is defined as a match between two values that is a complete match. When a first value and a second value have identical features (e.g., characters or other digits) in an identical arrangement (e.g., are the same word or number), the values can be an exact match. For example, if the first value is "George" and the second value is "George", the first value and the second value are an exact match. When a first value and a second value have any difference in features and/or arrangement of features, the values are not an exact match. For example, if the first value is "George" and the second value is "Georgia", the first value and the second value are not an exact match.

In this description and the following claims, an "n-gram" is defined as a contiguous sequence of n items (where n represents a size) from a sequence of text or speech. An n-gram can be any combination of letters. However, the items can also be phonemes, syllables, letters, words or base pairs according to the application. n-grams can be collected from a text or speech corpus. An n-gram of size 1 is a "unigram"; size 2 is a "bigram" (or, less commonly, a "digram"); size 3 is a "trigram". Larger sizes can be referred to by the value of n, e.g., "four-gram", "five-gram", and so on.

In this description and in the following claims, an "approximate match" is defined as a partial match (or the similarity) between two values. When a first value and second value have some identical features (e.g., characters or other digits) that are partially identically arranged (e.g., portions of different words or numbers are the same), the field values have some amount of similarity and are thus an approximate match. Values can approximately match one another in a range between 0%-100% matching. As the number of identically arranged features (the similarity) between values increases so does a corresponding approximate matching percentage.

For example, when a first value is "singer" and a second value is "singers", the first value and the second value have some amount of similarity and are an approximate match. Likewise, when a first value is "swimming" and a second value is "running", the first field value and second field value also have some amount of similarity and are an approximate match. However, as "singer" and "singers" have more identically arranged features (i.e., are more similar) compared to "swimming" and "running", the percentage match between "singer" and "singers" is higher than the percentage match between "swimming" and "running".

In some embodiments, a Dice coefficient is used calculate an approximate match percentage (indicating the similarity) between values. However, any of a variety of different mechanisms can be used to calculate an approximate match, such as, for example, Sørensen similarity index, Jaccard index, Tversky index, Levenshtein distance, etc.

Generally, a Dice coefficient between two items can be calculated according to the following equation: $s=(2|X \cap Y|)/(|X|+|Y|)$. Thus, for sets X and Y of keywords in information retrieval, the coefficient may be defined as twice the shared information (the intersection) over the sum of cardinalities. When taken as a string similarity measure, the Dice coefficient may be calculated for two strings, x and y using n-grams (e.g., bigrams, trigrams, etc.) as follows: $s=2n_t/n_x+n_y$, where $n_t$ is the number of n-grams found in both strings, $n_x$ is the number of n-grams in string x, and $n_y$ is the number of n-grams in string y.

For example, one mechanism to calculate similarity between "night" and "nacht" using bigrams is to create the following bigram sets {ni, ig, gh, ht} and {na, ac, ch, ht} for each word respectively. Each set has four elements and the intersection of the two sets has one element in common, ht. Inserting these numbers into the formula, $s=(2 \times 1)/(4+4)=0.25$ (25%).

Other mechanisms can use blank characters preceding and/or succeeding a word. For example, another mechanism to calculate similarity between "night" and "nacht" using bigrams is to create the following bigram sets {$n, ni, ig, gh, ht, t$} and {$n, na, ac, ch, ht, t$} for each word respectively. Each set has six elements and the intersection of the two sets has three elements in common, $n, ht, and t$. Inserting these numbers into the formula, s=(2×3)/(6+6)=0.5 (50%)

Other mechanisms to calculate similarity can use trigrams (or n-grams with higher n values). For example, one mechanism to calculate similarity between "George" and "Georgia" using trigrams is to create the following trigram sets {$$G, $Ge, Geo, eor, org, rge, ge$, and e$$} and {$$G, $Ge, Geo, eor, org, rgi, gia, ia$, a$$} for each word respectively. One set has eight elements, one set has nine elements and the intersection has five elements in common $$G, $Ge, Geo, eor, and org. Inserting these numbers into the formula s=(2×5)/(8+9)=~0.5882 (~58.82%).

In this description and in the following claims, an "exact match field" is defined as a field for which either an exact match or no match is indicated as the result of a comparison. When an exact match is indicated, an exact match field contributes 100% to a matching score between records. When no match is indicated, an exact match field contributes 0% to a matching score between records.

In this description and in the following claims, an "approximate match field" is defined as a field for which a similarity percentage is calculated and the calculated similarity percentage contributes to a matching score between records.

Embodiments of the invention can be used for finding candidate entries for deduplication from a table. A table can be processed to compute an inverse index for each field of the table. A deduplication algorithm can traverse the inverse indices in accordance with a flexible user-defined policy to identify candidate records for deduplication. Both exact-matches and approximate-matches can be found.

Figure 1B:
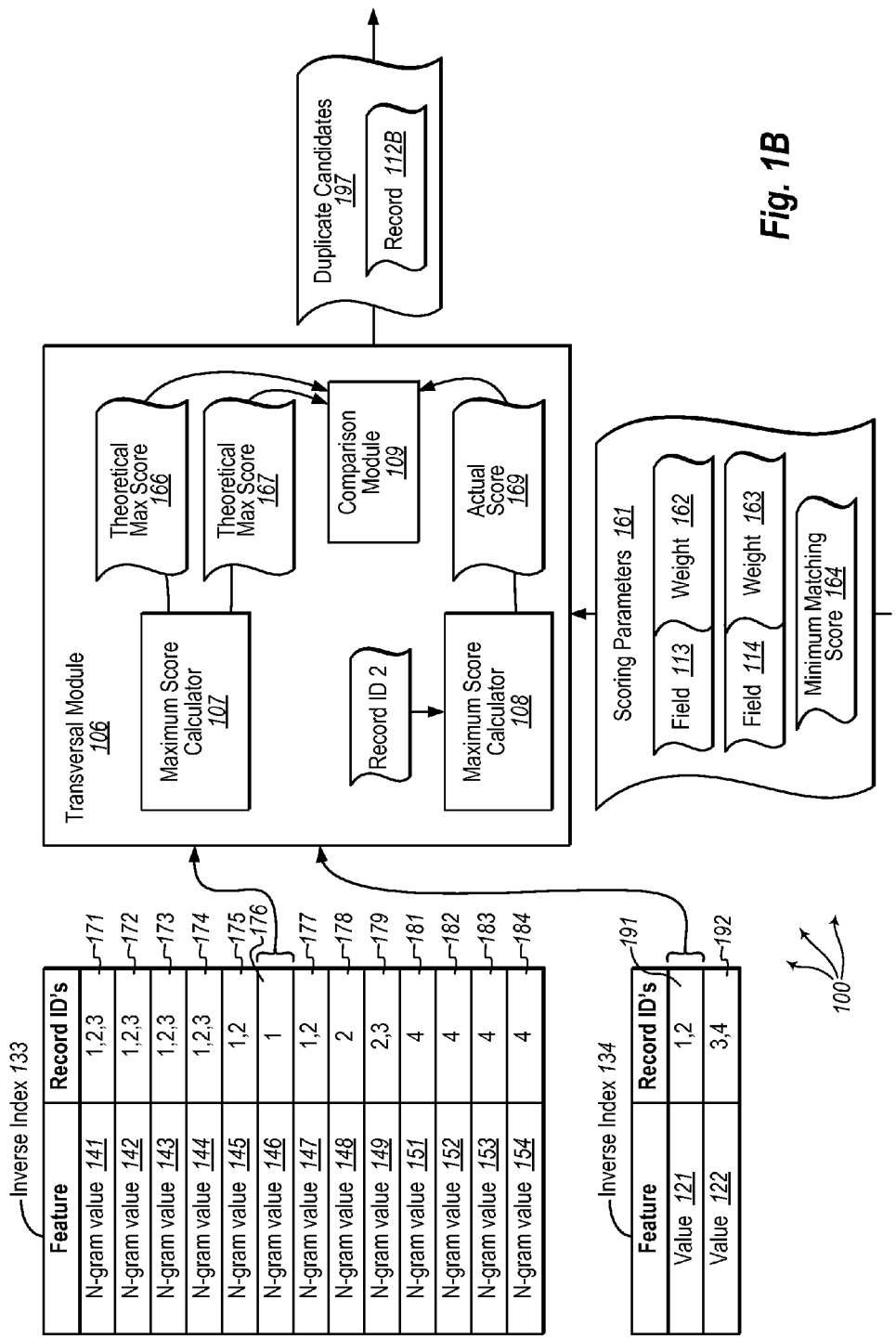

FIGS. 1A and 1B illustrate an example computer architecture 100 that facilitates selecting candidate records for deduplication from a table. Referring to FIGS. 1A and 1B, computer architecture 100 includes index creation module 101 and traversal module 106. Index creation module 101 and traversal module 106 can be connected to one another over (or is part of) a network, such as, for example, a Local Area Network ("LAN"), a Wide Area Network ("WAN"), and even the Internet. Accordingly, index creation module 101 and traversal module 106 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, index creation module 101 is configured to create an inverse index for each field in table. An inverse index for a field matches each feature contained in a field value for the field to a set of records that include the feature. A feature can be an n-gram (e.g., a bigram, trigram, etc.) or can be an actual (complete) field value.

As depicted, index creation module 101 includes decomposition module 102 and mapping module 103. For each field, decomposition module 102 is configured to decompose field values into one or more features, such as, for example, n-grams. Decomposition module 102 can refer to field type parameters to determine what and how field values for each field of a table are to be decomposed. Field type parameters can indicate a field type, such as, for example, approximate match or exact match. When a field is indicated as an approximate match field, field type parameters can also indicate an n-gram length (e.g., n=2 [bigrams], n=3 [trigrams], etc.) to use when decomposing the field. When a field is indicated as an exact match field, decomposition module 102 may ignore the field.

Field type parameters can be defined by a user. Field type parameters can be contained within a table that is to be deduplicated, contained in a separate file accessible to index creation module 101, or set as configuration parameters of and stored internally to index creation module 101.

Mapping module 103 is configured to map field value features (e.g., n-grams or complete field values) to record sets within a corresponding inverse index. When accessing a feature, mapping module 103 can determine if the feature is already included in the appropriate inverse index. When the feature is already included, an indication of the record where the feature originated (e.g., a record ID) can be stored in a record set corresponding to the feature. When the feature is not already included, a new record set for the feature can be added to the appropriate inverse index and an indication of the record where the feature originated can be stored in the newly created record set.

Turning to FIG. 1B, for a record being checked for duplicates, traversal module 106 is generally configured to select duplicate candidates for the record in accordance with user defined scoring parameters. Scoring parameters can define a minimum matching score and weights for each field in a table. A minimum matching score indicates a specified level of similarity a record is to have with another record for the other record to be considered a duplicate candidate of the record. Field weights can be applied when combining scores for individual fields to calculate an actual matching score between records. Scoring parameters can be defined by a user. Scoring parameters can be contained within a table that is to be deduplicated, contained in a separate file accessible to traversal module 106, or set as configuration parameters of and stored internally to traversal module 106.

As depicted, traversal module 106 includes maximum score calculator 107, actual score calculator 108, and comparison module 109. Traversal module 106 can traverse one or more inverse indices together from smallest to largest record set. For a record being checked for duplicates, initially and after each previously identified record set, traversal module 106 can access a record set, from among all the inverse indices, that identifies the next smallest number of other records.

Maximum score calculator 107 is configured to calculate a theoretical maximum matching score for any other records not identified in the accessed record set. For example, if a record includes seven trigrams for a field, and a first accessed record set identifies only the record itself, any other records in the table can at most match six of the seven trigrams for the corresponding field in this record. From this knowledge, a theoretical maximum matching score for any non-identified records can be calculated. Comparison module 109 is configured to compare a theoretical maximum matching score to a minimum matching score. When the theoretical maximum matching score does not satisfy the minimum matching score, traversal of the inverse indices can stop (since it is not possible for any of the non-identified records to have an actual matching score that satisfies the minimum matching score).

Actual score calculator 108 is configured to calculate an actual matching score for any records identified during traversal (since it is possible for identified records to have an actual matching score that satisfies the minimum matching score). Comparison module 109 is configured to compare actual matching scores to the minimum matching score. Any identified records having an actual matching score that satisfies the minimum matching score can be selected as duplicate candidates for the record being checked for duplicates. Duplicate candidates can be subject to further processing, including human decision making, to identify a duplicate candidate as an actual duplicate and remove the duplicate from a table.

Figure 2:
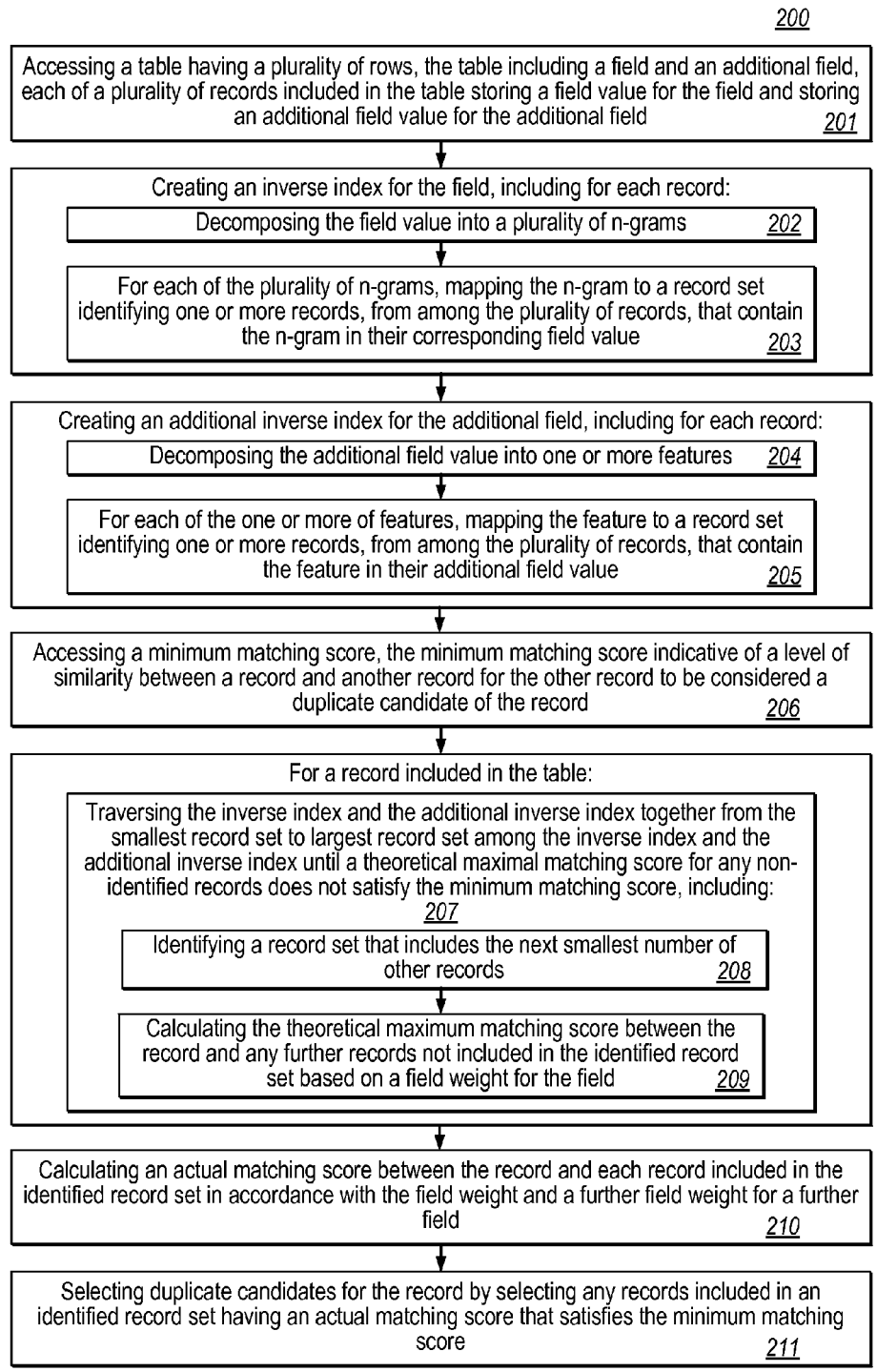
FIG. 2 illustrates a flow chart of an example method for selecting candidate records for deduplication from a table.

FIG. 2 illustrates a flow chart of an example method 200 for selecting candidate records for deduplication from a table. Method 200 will be described with respect to the components and data of computer architecture 100.

Method 200 includes an act of accessing a table having a plurality of records, the table including a field and an additional field, each of a plurality of records included in the table storing a field value for the field and storing an additional field value for the additional field (act 201). For example, referring again to FIG. 1A, index creation module 101 can access table 111. Table 111 includes records 112A, 112B, 112C, and 112D and fields 113 and 114. Records 112A, 112B, 112C, and 112D store values 116, 117, 118, and 119 respectively for field 113. Records 112A, 112B, 112C, and 112D store values 121, 121, 122, and 122 respectively for field 114. Each of records 112A, 112B, 112C, and 112D is also identified by record IDs 1, 2, 3, and 4 respectively.

Index creation module 101 can refer to field type parameters 126 to determine how to treat each field of table 111 during inverse index creation. Field type parameters 126 define field 113 as an approximate match field. Field type parameters 126 also define that field values in field 113 are to be decomposed into n-grams of n-gram length 131 (e.g., 1, 2, 3, 4, etc. characters). Field type parameters 126 also define field 114 as a field of type 132. Type 132 can represent an approximate match field or an exact match field. Thus, field type parameters 132 define table 111 as including an approximate match field and at least one other field. The at least one other field can be an approximate match field or an exact match field.

Accordingly, from field type parameters 126, index creation module 101 can determine that field 113 is an approximate match field. Index creation module 101 can also determine that field values in field 113 are to be decomposed into n-grams (e.g., character sequences) of n-gram length 131 (e.g., 1 [unigrams], 2 [bigrams], 3 [trigrams], 4 fourgrams, etc.). From field type parameters, 126, index creation module 101 can also determine that field 114 is a field of type 132. When type 132 defines an approximate match field, index creation module 101 can process field 114 as an approximate match field. On the other hand, when type 132 defines an exact match field, index creation module 101 can process field 114 as an exact match field.

Method 200 includes creating an inverse index for the field. For example, index creation module 101 can create inverse index 133 for field 113.

For each record, creating an inverse index for the field includes decomposing the field value into a plurality of n-grams (act 202). For example, decomposition module 102 can decompose value 116 into n-grams 141-147. Similarly, decomposition module 102 can decompose value 117 into n-gram values 141-145, 147-149. Likewise, decomposition module 102 can decompose value 118 into n-gram values 141-144 and 149. Additionally, decomposition module 102 can decompose value 118 into n-gram values 151-154. Each of n-gram values 141-149 and 151-154 can be of n-gram length 131.

For each record, creating an inverse index for the field includes, for each of the plurality of n-grams, mapping the n-gram to a record set identifying one or more records, from among the plurality of records, that contain the n-gram in their corresponding field value (act 203). For example, for record 112A, mapping module 103 can map record ID 1 to record sets 171-177 (the record sets corresponding to n-gram values 141-147) respectively. Similarly, for record 112B, mapping module 103 can map record ID 2 to record sets 171-175 and 177-179 (the record sets corresponding to n-gram values 141-145 and 147-149) respectively. Likewise, for record 112C, mapping module 103 can map record ID 3 to record sets 171-174 and 179 (the record sets corresponding to n-gram values 141-144 and 149) respectively. Additionally, for record 112D, mapping module 103 can map record ID 4 to record sets 181-184 (the record sets corresponding to n-gram values 151-154) respectively.

Method 200 includes creating an additional inverse index for the additional field. For example, index creation module 101 can create inverse index 134 for field 114.

For each record, creating an inverse index for the additional field includes decomposing the additional field value into one or more features (act 204). When type 132 defines field 114 as an exact match field, decomposition module 102 can retain field values from field 114 (e.g., field values 121 and 122) without modification. That is, each of field values 121 and 122 are essentially decomposed into a single feature, which are field values 121 and 122 respectively.

On the other hand, when type 132 defines field 114 as an approximate match field, decomposition module 102 can decompose field values from field 114 into n-grams (e.g., similar to act 202). When decomposing field values from field 114 into n-grams, n-gram length 131 can be used. Alternately, field type parameters 126 can define a different n-gram length to use when decomposing field values from field 114.

For each record, creating an inverse index for the additional field includes for each of the one or more of features, mapping the feature to a record set identifying one or more records, from among the plurality of records, that contain the feature in their additional field value (act 205). When type 132 defines field 114 as an exact match field, mapping module 103 can map record IDs to record sets corresponding to field values. For example, for records 112A and 112B, mapping module 103 can map record IDs 1 and 2 to record set 191 (the record set corresponding to value 121). Similarly, for records 112C and 112D, mapping module 103 can map record IDs 3 and 4 to record set 192 (the record set corresponding to value 122).

When type 132 defines field 114 as an approximate match field, mapping module 103 can map record IDs to record sets corresponding to n-grams contained in the corresponding records (e.g., similar to act 203).

Method 200 includes an act of accessing a minimum matching score, the minimum matching score indicative of a level of similarity between a record and another record for the other record to be considered a duplicate candidate of the record (act 206). For example, turning to FIG. 1B, traversal module 106 can access scoring parameters 161. Scoring parameters 161 define minimum matching score 164. Scoring parameters 161 also define fields 113 and 114 to have field weights 163 and 164 respectively. When field weights are not included in scoring parameters 161, each field in a table can be given equal weight.

For a record included in the table, method 200 includes traversing the inverse index and the additional inverse index together from the smallest record set to largest record set among the inverse index and the additional inverse index until a theoretical maximum matching score for any non-identified records does not satisfy the minimum matching score (act 207). For example, for record 112A (record ID 1), traversal module 106 can traverse inverse index 133 and inverse index 134 together from smallest record set to largest record set (among records sets 171-177 and 191) until a theoretical maximum matching score for any non-identified records does not satisfy minimum matching score 164.

Act 207 includes identifying a record set that includes the next smallest number of other records (act 208). For example (for record ID1), since record set 176 includes a single record, traversal module 106 can initially identify record set 176. Act 207 includes calculating the theoretical maximum matching score between the record and any further records not included in the identified record set based on a field weight for the field (act 209). For example, maximum score calculator 107 can calculate theoretical maximum score 166. Theoretical maximum score 166 is a theoretical maximum matching score between record 112A and any of records 112B, 112C, and 112D based on field weight 162. Since record set 176 identifies only record 112A (record ID 1), theoretical maximum score 166 is calculated with the knowledge that records 112B, 112C, and 112D can have at most six of seven trigrams found in field 113 in common with record 112A and also with the knowledge of field weight 162.

Act 207 can include comparison module 109 comparing theoretical max score 167 to minimum matching score 164. In general, when a theoretical maximum score satisfies minimum matching score 164, act 208 is repeated. For example, when theoretical max score 166 satisfies minimum matching score 164, traversal module 106 can identify record set 191 (or some other record set from either of inverse index 133 or inverse index 134, such as, for example, record set 175 or 177) as including record 112A and one other record.

Act 209 can then be repeated for the identified record set. For example, maximum score calculator 107 can calculate theoretical maximum score 167. Theoretical maximum score 167 is a theoretical maximum matching score between record 112A and any of records 112C and 112D based on field weight 163. Record set 176 identifies record 112A (record ID 1) and record 112B (record ID 2). As such, theoretical maximum score 167 is calculated with the knowledge that records 112C and 112D do not include field value 121 and with the knowledge of field weight 163 (and with the prior knowledge that any of the other records have at most six of seven n-grams found in field 113 in common with record 112A and with the knowledge of field weight 162).

Act 207 can include comparison module 109 comparing theoretical max score 167 to minimum matching score 164. In general, when a theoretical maximum score does not satisfy minimum matching score 164, traversal is ended. For example, when theoretical max score 166 or theoretical max score 167 does not satisfy minimum matching score 164, traversal module 106 stops traversing inverse indices 133 and 134.

For the record, method 200 includes calculating an actual matching score between the record and each record included in the identified record set in accordance with the field weight and a further field weight for the further field (act 210). For example, when theoretical max score 167 does not satisfy minimum matching score 164, record 112B (record ID 2) is identified in record set 191. Thus, for record 112A, actual score calculator 108 can calculate actual score 169 for record 112B. Actual score 169 can take into account field weights 162 and 163.

For the record, method 200 includes selecting duplicate candidates for the record by selecting any records included in an identified record set having an actual matching score that satisfies the minimum matching score (act 211). For example, for record 112A, comparison module 109 can compare actual score 169 to minimum matching score 164. If actual score 169 satisfies minimum matching score 164, record 112B can be included in duplicate candidates 197 (as a possible duplicate of record 112A). On the other hand, if actual score 169 does not satisfy minimum matching score 164, record 112B is not included in duplicate candidates 197. Duplicate candidates 197 can be subject to further processing, including human decision making, to identify a duplicate candidate as an actual duplicate of record 112A and remove the duplicate from a table 111.

In general, since not all records are traversed, duplicate candidates can be identified with increased time efficiency. Further, duplicate candidates can be identified with relatively high accuracy. As described, after some amount of inverse index traversal, it can be determined that a number of features (e.g., n-grams) are not shared between fields in an original record and fields in any remaining non-identified records in a table. For at least this reason, a theoretical matching score for the remaining non-identified records cannot be larger than a specified constant.

For example, for a string value with L trigrams and another string that does not have $\beta$ trigrams contained in the string, the Dice coefficient between the two records cannot be larger than: $1-(1/((2L/\beta)-1))$. For example, "hello" can be decomposed into the follow set of trigrams {\$\$h, \$he, hel, ell, llo, lo\$, o\$\$} (L=7). If another record has a field value without two of the trigrams ($\beta$=2) in the set of trigrams, the maximum possible Dice Coefficient for the other record is: $1-(1/((2\times7)/2)-1)=1-(1/(7-1))=1-1/6=\sim0.8333$, or ~83.33%.

This algorithm can be used when computing a theoretical maximum matching score for a single inverse index created for an approximate match field. After decomposing a field value and fetching record sets, $\beta$ can be computed for a current record's L, the maximum possible Dice coefficient can be calculated and compared to M (a minimum matching score). For a smallest record set, $\beta$=1 for any records not included in the record set along with the current record. For the next smallest record set, $\beta$=2 for any records not included in the record set along with the current record. Traversal can continue until, based on the value of $\beta$, no remaining records can satisfy M.

Figure 3:
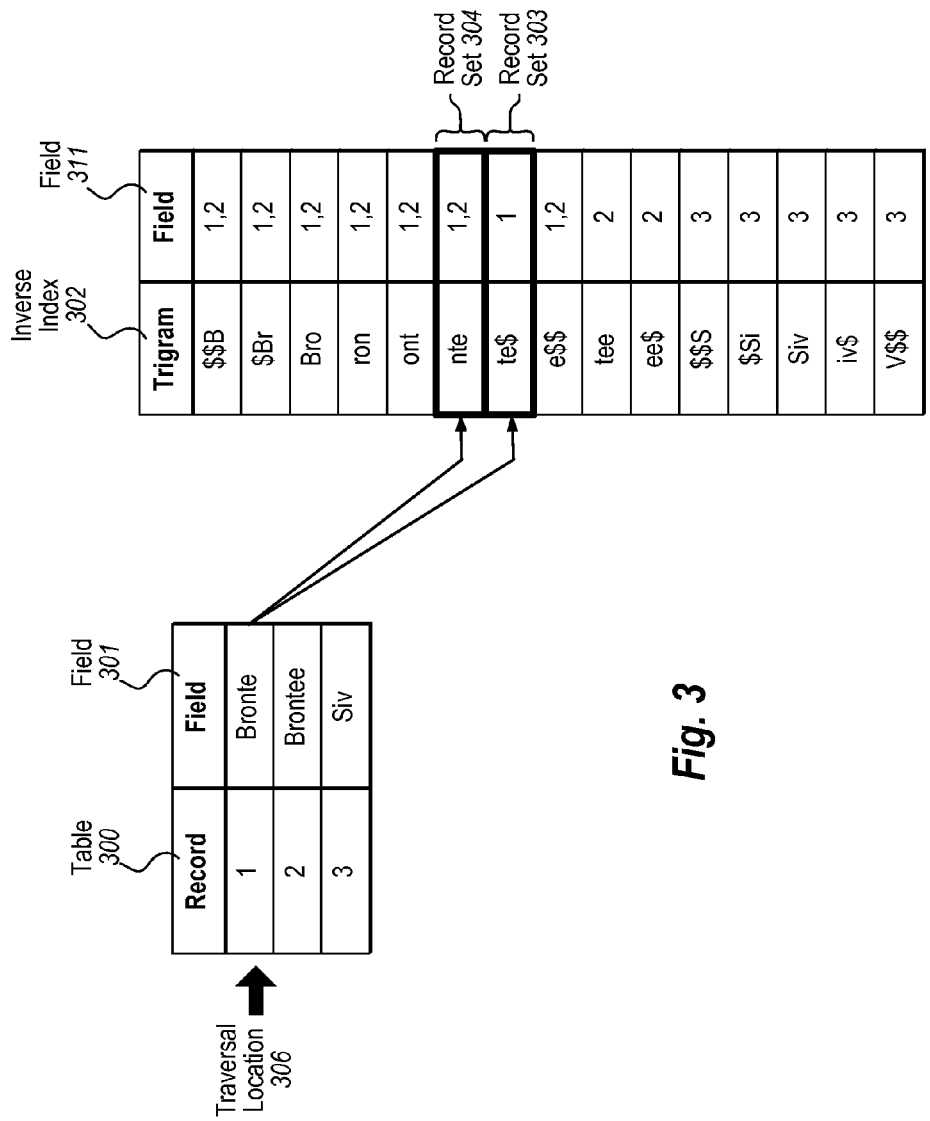
FIG. 3 illustrates an example of traversing an inverse index for a single field.

FIG. 3 illustrates an example of traversing inverse index 302 for a single field 301. As depicted, table 300 includes field 301 (an approximate match field). Inverse index 302 has been created from the values stored in field 301. As indicated by traversal location 306, duplicate candidates for record 1 are being identified. A user-defined matching value of 90% is selected (i.e., M=90%). Thus, matching values of 90% or greater for a record are considered sufficient to be a duplicate candidate.

Traversal begins at record set 303, the smallest record set for a trigram contained in record 1. From traversal of record set 303, $\beta$=1. For $\beta$=1, the theoretical maximum matching score for other records not iterated yet is $1-(1/((2\times8)/1)-1)=1-(1/(16-1))=1-1/15=\sim0.9333$, or 93.33%. 93.33% is greater than 90% so it is possible that other records may have actual matching scores sufficient to be considered a duplicate candidate.

Traversal then proceeds to record set 304, one of the next smallest record sets for a trigram contained in record 1. From traversal of record set 304, $\beta$=2, for all records other than record 2. For $\beta$=2, the theoretical maximum matching score for other records not iterated yet is $1-(1/((2\times8)/2)-1)=1-(1/(8-1))=1-1/7=\sim0.8571$, or 85.71%. 85.71% is less than 90% so it is not possible for any other records (other than record 2) to have an actual matching score sufficient to be considered a duplicate candidate of record 1. Thus, without actually visiting record 3 it is ruled out as a duplicate candidate for record 1.

An actual matching score for record 2 can be calculated as: $2(7)/(8+9)=14/17=\sim0.8235$, or ~82.35%. Thus, although it was theoretically possible for record 2 to satisfy 90%, the actual matching score for record 2 it is insufficient to be selected as s duplicate candidate.

Similar techniques can be applied to handle multi-field tables. Inverse indices can be created for approximate match fields (e.g., using trigrams) and exact match fields (e.g., using actual field values). A current $\beta$ for each approximate match field can be saved ($\beta$ indicating the number of record sets already traversed for that field). Field values are also saved for all exact match fields iterated over. A weighted sum can then be computed to determine a theoretical maximum matching score after these sets are considered. When a theoretical maximum matching score is less than M traversal stops.

Figure 4:
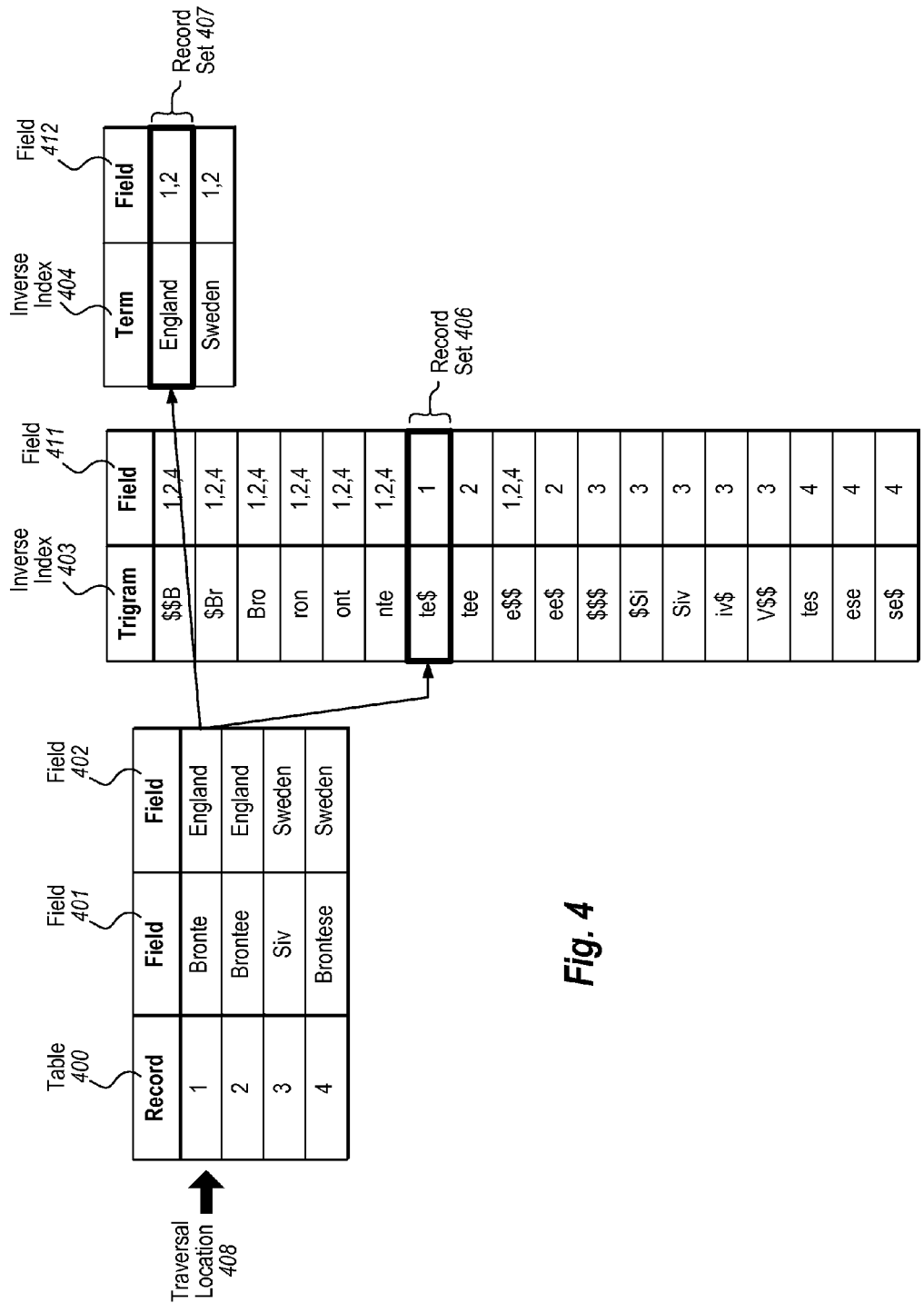
FIG. 4 illustrates an example of traversing inverse indices for multiple fields.

FIG. 4 illustrates an example of traversing inverse indices 403 and 404 for fields 401 and 402 respectively. As depicted, table 400 includes field 401 (an approximate match field) and field 402 (an exact match field). Inverse index 403 has been created from the values stored in field 401. Inverse index 404 has been created from the values stored in field 402. As indicated by traversal location 408, duplicate candidates for record 1 are being identified. A user-defined matching value of 85% is selected (i.e., M=85%). Thus, matching values of 85% or greater for a record are considered sufficient to be a duplicate candidate. Fields 401 and 402 can be equally weighted (i.e., 50% weight for each field).

Traversal begins at record set 406 (size 1), the smallest record set for a trigram/feature contained in record 1. From traversal of record set 406, $\beta=1$. For $\beta=1$, the theoretical maximum matching score for other records not iterated yet is $1-(1/((2\times8)/1)-1)=1-(1/(16-1))=1-1/15=\sim0.9333$, or 93.33% for field 401. Since no records in inverse index 404 have been traversed, the theoretical maximum matching score for other records is ~96.66% (i.e., 93.33%(0.5)+100% (0.5)) after traversing record set 406. 96.66% is greater than 85% so it is possible that other records may have actual matching scores sufficient to be considered a duplicate candidate.

Traversal then proceeds to record set 407 (size 2), the next smallest record set for a trigram/feature contained in record 1. From traversal of record set 407, it is determined that field 402 makes a contribution to an overall matching score for record 2 but not for any other records. The theoretical matching score for records not included in record set 407 and in view of $\beta=1$ for inverse index 403 is: 93.33%(0.5)+0%(0.5)=~0.4666, or 46.66%. 46.66% is less than 85% so it is not possible for any other record (other than record 2) to have an actual matching score sufficient to be a duplicate candidate. Thus, without actually visiting records 3 and 4 they are ruled out as duplicate candidates for record 1.

An actual matching score for record 2 can be calculated. The contribution for field 401 is $2(7)/(8+9)=14/17=\sim0.8235$, or ~82.35%. The contribution for field 402 is 100%. Thus, the actual matching score for record 2 is 82.35%(0.5)+100% (0.5)=~91.17%. 91.17% is greater than 85% so record 2 can be considered a duplicate candidate of record 1.

During traversal, it may be that multiple record sets in the same and/or in different inverse indices are of the next smallest size. Selecting a next record set in these circumstances can be arbitrary or can be according to user defined policy. In some embodiments, a policy can favor selecting record sets that yield a bigger weight reduction (weight reduction for a current iteration can be pre-computed).

Figure 5:
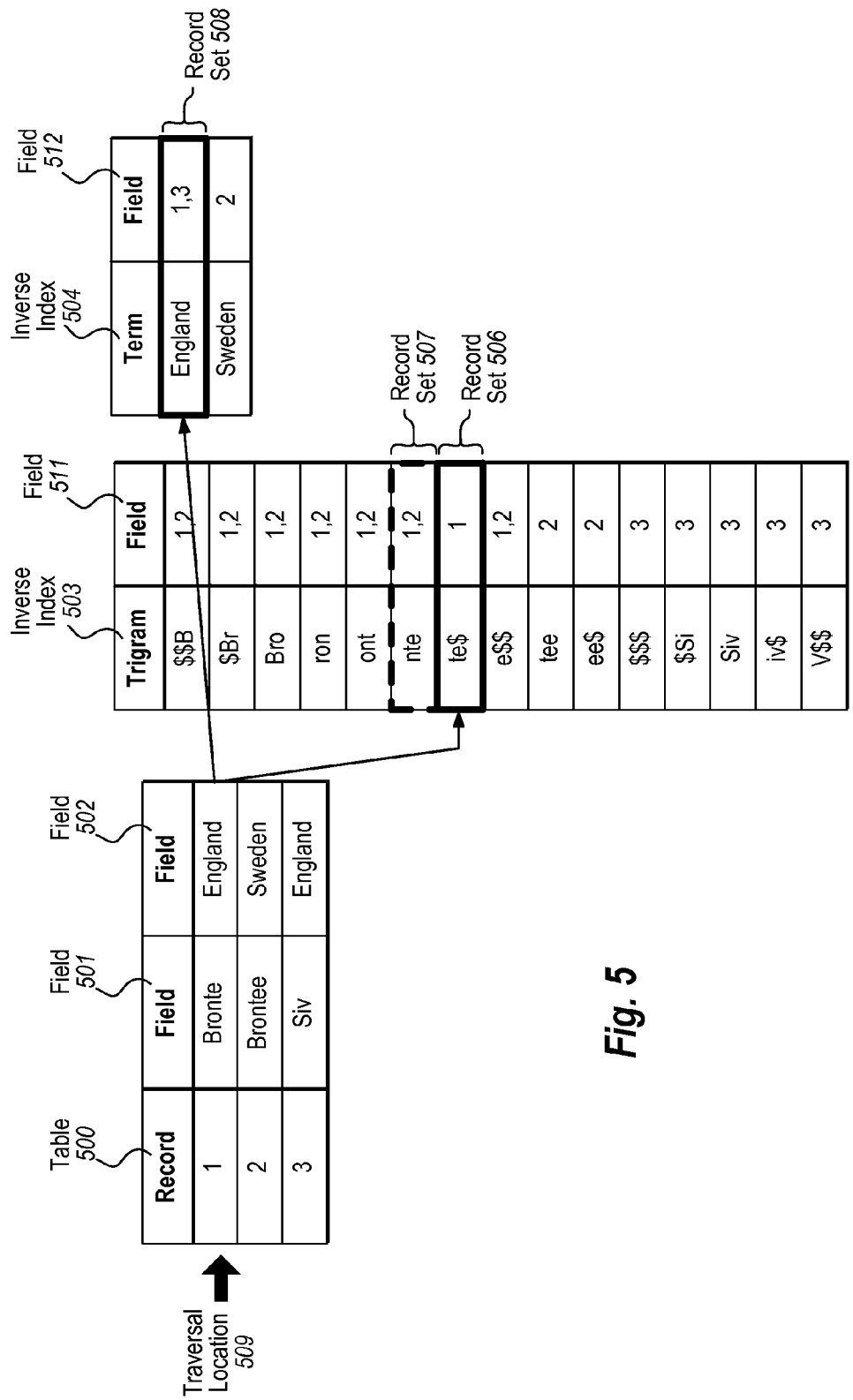
FIG. 5 illustrates another example of traversing inverse indices for multiple fields.

FIG. 5 illustrates an example of traversing inverse indices 503 and 504 for fields 501 and 502. As depicted, table 500 includes field 501 (an approximate match field) and field 502 (an exact match field). Inverse index 503 has been created from the values stored in field 501. Inverse index 504 has been created from the values stored in field 502. As indicated by traversal location 509, duplicate candidates for record 1 are being identified. A user-defined matching value of 85% is selected (i.e., M=85%). Thus, matching values of 85% or greater for a record are considered sufficient to be a duplicate candidate. Fields 501 and 502 can be equally weighted (i.e., 50% weight for each field).

Traversal begins at record set 506 (size 1), the smallest record set for a trigram/feature contained in record 1. From traversal of record set 506, $\beta=1$. For $\beta=1$, the theoretical maximum matching score for other records not iterated yet is $1-(1/((2\times8)/1)-1)=1-(1/(16-1))=1-1/15=\sim0.9333$, or 93.33% for field 501. Since no records in inverse index 504 have been traversed, the theoretical maximum matching score for other records is ~96.66% (i.e., 93.33%(0.5)+100% (0.5)) after traversing record set 506. 96.66% is greater than 80% so it is possible that other records may have actual matching scores sufficient to be considered a duplicate candidate.

After traversal of record set 506, there are one or more record sets in each of inverse indices 503 and 504 that include record 1 and just one other record. For example, record set 507 includes record 1 and record 2 and record set 508 includes record 1 and record 3.

If record set 507 is selected for traversal, $\beta=2$. For $\beta=2$, the theoretical maximum matching score for other records not iterated yet is $1-(1/((2\times8)/2)-1)=1-(1/(8-1))=1-1/7=\sim0.8571$, or 85.71%. Since no records in inverse index 504 have been traversed, the theoretical maximum matching score for other records is ~92.85% (i.e., 85.71%(0.5)+100% (0.5)) after traversing record set 507. 92.85% is greater than 80% so it is possible that other records may have actual matching scores sufficient to be considered a duplicate candidate.

If record set 508 is selected, it is determined that field 502 makes a contribution to an overall matching score for record 3 but not for any other records. The theoretical matching score for records not included in record set 407 and in view of $\beta=1$ for inverse index 403 is: 93.33%(0.5)+0%(0.5)=~0.4666, or 46.66%. 46.66% is less than 85% so it is not possible for any other record (other than record 3) to have an actual matching score sufficient to be a duplicate candidate. Thus, without actually visiting record 2 it is ruled out as duplicate candidate for record 1.

As such, selection of record set 508 may be preferred over selection of record set 507 to yield greater weight reduction.

Figure 6:
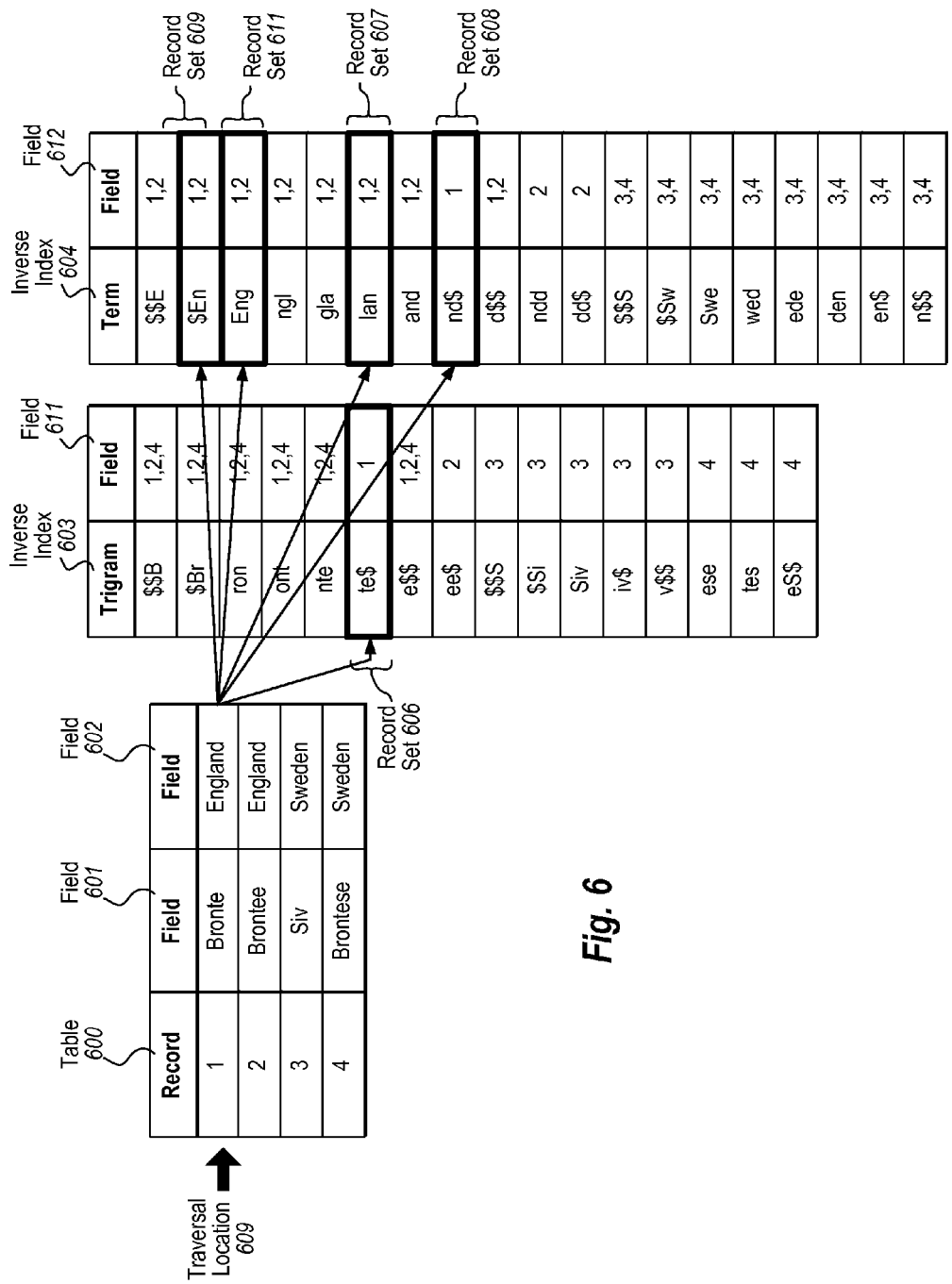
FIG. 6 illustrates another example of traversing inverse indices for multiple fields.

FIG. 6 illustrates an example of traversing inverse indices 603 and 604 for fields 601 and 602. As depicted, table 600 includes field 601 (an approximate match field) and field 602 (also an approximate match field). Inverse index 603 has been created from the values stored in field 601. Inverse index 604 has been created from the values stored in field 602. As indicated by traversal location 509, duplicate candidates for record 1 are being identified. A user-defined matching value of 82% is selected (i.e., M=82%). Thus, matching values of 82% or greater for a record are considered sufficient to be a duplicate candidate. Field 501 is weighted 40% and 502 is weighted 60%.

As depicted, both record sets 606 and 608 are of size 1 so an arbitrary (or rule-based) selection can be made. In FIG. 6, record set 608 is arbitrarily selected for traversal.

From traversal of record set 608, $\beta=1$. For $\beta=1$, the theoretical maximum matching score is $1-(1/((2\times9)/1)-1)=1-(1/(18-1))=1-1/17=\sim0.9411$, or 94.11% for field 602. After traversal of record set 608, the theoretical maximum matching score for other records not iterated yet is ~96.46% (i.e., 100%(0.4)+94.11%(0.6)). 96.46% is greater than 82% so it is possible that other records may have actual matching scores sufficient to be considered a duplicate candidate of record 1.

Traversal then continues at record set 606 (size 1), the next smallest record set for a trigram/feature contained in record 1. From traversal of record set 606, $\beta=1$. For $\beta=1$, the theoretical maximum matching score is $1-(1/((2\times8)/1)-1)=1-(1/(16-1))=1-1/15=\sim0.9333$, or 93.33% for field 601. After traversal of record set 606, the theoretical maximum matching score for other records not iterated yet is ~93.79% (i.e., 93.33%(0.4)+94.11%(0.6)). 93.79% is greater than 82% so it is possible that other records may have actual matching scores sufficient to be considered a duplicate candidate of record 1.

After traversal of record set 606, there are a number of remaining record sets of size 2. From the record sets of size 2, record set 607 can be arbitrarily selected for traversal. For $\beta=2$, the theoretical maximum matching score is $1-(1/((2\times9)/2)-1)=1-(1/(9-1))=1-1/8=0.875$, or 87.5% for field 602. After traversal of record set 607, the theoretical maximum matching score for other records not iterated yet is ~89.8% (i.e., 93.33%(0.4)+87.5%(0.6)) after traversing record set 608. 89.9% is greater than 82% so it is possible that other records may have actual matching scores sufficient to be considered a duplicate candidate of record 1.

After traversal of record set 607, there are a number of remaining record sets of size 2. From the record sets of size 2, record set 609 can be arbitrarily selected for traversal. For $\beta=3$, the theoretical maximum matching score is $1-(1/((2\times9)/3)-1)=1-(1/(6-1))=1-1/5=\sim0.8$, or 80% for field 602. After traversal of record set 609, the theoretical maximum matching score for other records not iterated yet is ~85.33% (i.e., 93.33%(0.4)+80%(0.6)) after traversing record set 608. 85.33% is greater than 82% so it is possible that other records may have actual matching scores sufficient to be considered a duplicate candidate of record 1.

After traversal of record set 609, there are a number of remaining record sets of size 2. From the record sets of size 2, record set 611 can be arbitrarily selected for traversal. For $\beta=4$, the theoretical maximum matching score is $1-(1/((2\times9)/4)-1)=1-(1/(4.5-1))=1-1/3.5=\sim0.7142$, or 71.42% for field 602. After traversal of record set 611, the theoretical maximum matching score for other records not iterated yet is ~80.18% (i.e., 93.33%(0.4)+71.42%(0.6)) after traversing record set 608. 80.18% is less than 82% so it is not possible for any other record (other than record 2) to have an actual matching score sufficient to be a duplicate candidate of record 1.

An actual matching score for record 2 can be calculated. The contribution for field 601 is $40\%\times(2(7)/(8+9))=40\%\times(14/17)=\sim0.3294$, or ~32.94%. The contribution for field 602 is $60\%\times(2(8)/((9+10)=60\%\times(16/19)=\sim0.5052$, or ~50.52%. Thus, the actual matching score for record 2 is 32.94%+50.52%=83.46%, which is more than 82%. As such, record 2 is considered a duplicate of record 1.

Within this description, various examples have depicted and/or described tables having one or two fields and a limited number of records. However, embodiments of the invention are equally applicable to tables having three or more fields and including tens, hundreds, thousands or even millions of records. Embodiments of the invention are also applicable to a wide variety of different arrangements of approximate match and exact match fields. For example, embodiments can be used to identify deduplication candidates within tables including three or more approximate match fields as well as tables including three or more fields overall with one or more approximate fields and one or more exact match fields.

Various different algorithms can be used to implement embodiments of the invention. FIG. 7 illustrates an example algorithm 700 for iterating over records. Algorithm 700 is generally applicable for identifying deduplication candidates from tables having any configuration of approximate and exact match fields and any number of records.

Within the main loop, records are iterated over one by one and candidate records matching scores are checked. If a record's matching score is above the given threshold, these records are added to the returned set of record pairs. The algorithm uses a filtering scheme with indices so that not all records have to be considered as matching candidates.

FIG. 8 illustrates an example Build_Index subroutine 800 for building an index. Build_Index subroutine 800 represents one implementation of acts 202-205 of method 200. Within Build_Index subroutine 800:

$D_{Exact}$ is a set of exact-match fields ordinals $D_{Similar}$ is a set of approximate-match fields ordinals $r_i$ is the i'th record in the data table.

Build_Index subroutine 800 initializes two data-structures value_index, trigram_index which together hold the inverse indexes for de-duplication. Value_index holds inverse indices for exact match fields and trigram_index holds inverse indices for approximate match fields. Both are functions (in code they can be represented by hash-tables) which after the subroutine's completion can apply to the following:

The first, value_index is a function that maps field indexes in $D_{Exact}$ to functions. Each function value_index[l] maps strings that appear in the l'th field for some record to a set of records that contain that specific string in the l'th field. Formally, value_index[l][v]=$\{r_i | r_{i,l}=v\}$. Note that instead of the notation value_index[l][v] we've chosen the abbreviated notation value_index[l, v].

The second, trigram_index is a function that maps field indexes in $D_{Similar}$ to functions. Each function trigram_index[l] maps trigrams that are contained in the l'th field string value of some record to a set of records that contain that specific trigram in the l'th field. Formally, trigram_index[l][t]=$\{r_i | t \in r_{i,l}\}$. Note that instead of the notation trigram_index[l][t] we've chosen the abbreviated notation trigram_index[l, t].

FIG. 9 illustrates an example Find_Record_Duplicate_Candidates subroutine 900 for finding candidate records for deduplication. Find_Record_Duplicate_Candidates subroutine 900 represents one implementation of acts 207-211 of method 200. Find_Record_Duplicate_Candidates subroutine 900 utilizes a filtering scheme to efficiently filter the records list and retrieve a (e.g., small) set of matching candidate records. Find_Record_Duplicate_Candidates subroutine 900 performs the following in order to return a set of record candidates:

Decompose the current record ($r_1$)—After 2 completes, record_decomposition can hold pairs (l, S) where for each exact-match field 1, record_decomposition can have one pair (l, S) where S is the set of records that share the same value with current record $r_i$ in field 1. And for each approximate-match field 1, record_decomposition can have several pairs (l, S) for each of the trigrams in field 1 of record $r_i$ there can exist a pair (l, S) where S is the set of records that share the above mentioned trigram with current record $r_i$ in field 1.

Select a subset of record sets which still suffice in ensuring that records that were not traversed have no chance of being duplicates of current compared record. This is done by computing the theoretical maximum score possible assuming that record does not agree on currently visited field value/trigram we just considered. 7.c uses a Dice coefficient specific formula; other similarity coefficients can yield different formulas. filtered_records_sets can be a variable that holds the filtered set of records sets. Since record sets have been sorted by size, there is an increased probability of ending up with a relatively small number of records over all sets. Set S can save all traversed records while traversing records in different record sets. Set S can be used to insure that the same record is not suggested twice.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including one or more processors and system memory, a method for selecting a set of one or more records, from among plurality of records, as candidates for de-duplication from a table, the method comprising:
   for a record included in the table:
      a processor identifying a record set that includes the record and the next smallest number of other records not yet checked as de-duplication candidates, the record set identified by collectively traversing both an inverse index and an additional inverse index together based on record set size from smaller to larger, the inverse index and the additional inverse index collectively traversed until any non-identified records lack the possibility of achieving a minimum defined similarity to be considered for de-duplication, the inverse index corresponding to a field of the table and the other inverse index corresponding to another field of the table;
      calculating a maximum possible similarity between the record and any further records not included in the identified record set by calculating a maximum possible similarity based on a number of n-crams in each of the record's field value that are not included in any of the further records' field values;
      eliminating any of the further records having a maximum possible similarity insufficient to be considered a duplicate of the record as a possible de-duplication candidate;
      calculating an actual similarity between the record and each record included in the identified record set; and
      selecting any records from the identified record set that have an actual similarity sufficient to be considered a duplicate of the record as a candidate for de-duplication.

2. The method of claim 1, further comprising creating the inverse index, including for each record in the table:
   decomposing the field value for the field into a plurality of n-grams; and
   for each of the plurality of n-grams, mapping the n-gram to a record set identifying one or more records, from among the plurality of records, that contain the n-gram in their corresponding field value for the field.

3. The method as recited in claim 2, wherein decomposing the field value for the field into a plurality of n-grams comprises decomposing the field value for the field into a plurality of trigrams.

4. The method of claim 2, further comprising creating the other inverse index, including for each record in the table:
   decomposing the field value for the other field into one or more features; and
   for each of the one or more of features, mapping the feature to a record set identifying one or more records, from among the plurality of records, that contain the feature in their field value for the other field.

5. The method of claim 4, wherein decomposing the field value for the other field into one or more features comprises decomposing the field value for the other field into a plurality of n-grams; and
   wherein, for each of the one or more of features, mapping the feature to a record set identifying one or more records, from among the plurality of records, that contains the feature in their field value for the other field comprises, for each n-gram in the plurality of n-grams, mapping the n-gram to a record set identifying one or more records, from among the plurality of records, that contain the n-gram in their corresponding field value for the other field.

6. The method of claim 2, wherein decomposing the field value for the other field into one or more features comprises decomposing the field value for the other field into a single feature that is the field value for the other field; and
   wherein, for each of the one or more of features, mapping the feature to a record set identifying one or more records, from among the plurality of records, that contain the feature in their field value for the other field comprises mapping the field value for the other field to a record set identifying one or more records, from among the plurality of records, that contain the field value for the other field.

7. The method of claim 1, wherein the field is an approximate match field and the other field is an approximate match field.

8. The method of claim 1, wherein the field is an approximate match field and the other field is an exact match field.

9. A computer program product for use at a computer system, the computer program product for implementing a method for selecting a set of one or more records as candidates for de-duplication from a table, the computer program product comprising one or more computer storage media having stored thereon computer-executable instructions that, when executed at a processor, cause the computer system to perform the method, including the following:
   for a record included in the table:
      identify a record set that includes the record and the next smallest number of other records not yet checked as de-duplication candidates, the record set identified by collectively traversing both an inverse index and an additional inverse index by record set size from smaller to larger, the inverse index and the additional inverse index collectively traversed until non-identified records lack the possibility of achieving a minimum defined similarity to be considered for de-duplication, the inverse index corresponding to a field of the table and the other inverse index corresponding to another field of the table;
      calculate a maximum possible similarity between the record and any further records not included in the identified record set by calculating a maximum possible similarity based on a number of n-grams in each of the record's field value that are not included in any of the further records' field values;

eliminate any of the further records having a maximum possible similarity insufficient to be considered a duplicate of the record as a possible de-duplication candidate; and calculate an actual similarity between the record and each record included in the identified record set; and select any records from the identified record set that have an actual similarity sufficient to be considered a duplicate of the record as a candidate for de-duplication.

10. The computer program product of claim 9, further comprising computer-executable instructions that, when executed, cause the computer system to create the inverse index, including for each record in the table:

decompose the field value for the field into a plurality of n-grams; and for each of the plurality of n-grams, map the n-gram to a record set identifying one or more records, from among the plurality of records, that contain the n-gram in their corresponding field value for the field.

11. The computer program product of claim 10, wherein computer-executable instructions that, when executed, cause the computer system to decompose the field value for the field into a plurality of n-grams comprise computer-executable instructions that, when executed, cause the computer system to decompose the field value for the field into a plurality of trigrams.

12. The computer program product of claim 9, further comprising computer-executable instructions that, when executed, cause the computer system to create the other inverse index, including for each record in the table:

decompose the field value for the other field into one or more features; and for each of the one or more of features, map the feature to a record set identifying one or more records, from among the plurality of records, that contain the feature in their field value for the other field.

13. The computer program product of claim 9, wherein field is an approximate match field and the other field is an approximate match field.

14. The computer program product of claim 9, wherein the field is an approximate match field and the other field is an exact match field.

15. A system, the system comprising:
one or more processors;
system memory, the system memory storing executable instructions; and
the one or more processors configured to execute the executable instructions to select a set of one or more records as candidates for de-duplication from a table, including the following:

for a record included in the table:

identify a record set that includes the record and the next smallest number of other records not yet checked as de-duplication candidates, the record set identified by collectively traversing both an inverse index and an additional inverse index by record set size from smaller to larger, the inverse index and the additional inverse index collectively traversed until non-identified records lack the possibility of achieving a minimum defined similarity to be considered for de-duplication, the inverse index corresponding to a field of the table and the other inverse index corresponding to another field of the table;

calculate a maximum possible similarity between the record and any further records not included in the identified record set by calculating a maximum possible similarity based on a number of n-grams in each of the record's field value that are not included in any of the further records' field values;

eliminate any of the further records having a maximum possible similarity insufficient to be considered a duplicate of the record as a possible de-duplication candidate; and calculate an actual similarity between the record and each record included in the identified record set; and select any records from the identified record set that have an actual similarity sufficient to be considered a duplicate of the record as a candidate for de-duplication.

16. The system of claim 15, further comprising the one or more processors configured to execute the executable instructions to:

create the inverse index, including for each record in the table:

decomposing the field value for the field into a plurality of n-grams; and for each of the plurality of n-grams, mapping the n-gram to a record set identifying one or more records, from among the plurality of records, that contain the n-gram in their corresponding field value for the field; and create the other inverse index, including for each record in the table:

decomposing the field value for the other field into one or more features; and for each of the one or more of features, mapping the feature to a record set identifying one or more records, from among the plurality of records, that contain the feature in their field value for the other field.

17. The system of claim 15, wherein the field is an approximate match field and the other field is an approximate match field.

18. The system of claim 15, wherein the field is an approximate match field and the other field is an exact match field.

* * * * *